Figure 1:
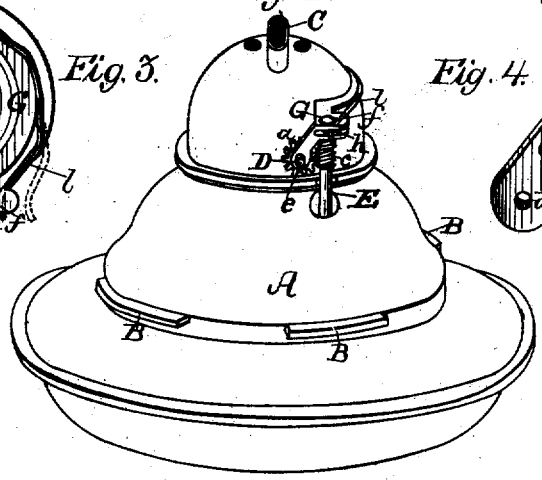

W. H. SMITH.
Wick-Raiser.

No. 8,684. Reissued April 22, 1879.

Witnesses:
George
M. F. Hallock

Willard H. Smith
Inventor:
by M. Bailey
his Attorney.

N. PETERS, PHOTO-LITHOGRAPHER, WASHINGTON, D. C.

UNITED STATES PATENT OFFICE.

WILLARD H. SMITH, OF BROOKLYN, NEW YORK.

IMPROVEMENT IN WICK-RAISERS.

Specification forming part of Letters Patent No. 186,960, dated February 6, 1877; Reissue No. 8,684, dated April 22, 1879; application filed November 15, 1878.

*To all whom it may concern:*

Be it known that I, WILLARD H. SMITH, of Brooklyn, in the county of Kings and State of New York, have invented certain new and useful Improvements in Wick-Raisers for Lamps, of which the following is a specification.

This invention relates to certain improvements in center or hanging lamps for street-cars, railroad-cars, and other vehicles and structures, its object being to provide for conveniently adjusting the lamp-wick without removing the lamp from its supporting gallery or frame.

In lamps as ordinarily constructed the wick is raised by means of one or more ratchets mounted on a horizontal shaft supported in bearings in the burner at one side of the wick-tube, the ratchet-teeth entering the wick, and the shaft being provided at one end with a button or milled head, by which it can be rotated to cause the ratchets to raise or lower the wick. A wick-adjuster of this kind, however, is inconvenient in cases where the lamp is placed in an elevated position, as it is when it is in the case of a center-lamp, or where it is held in a supporting gallery or frame with its upper part inclosed or surmounted by a glass shade.

To provide for cases of this kind the lamp has heretofore in some cases been provided with a shaft or rod whose lower end (having a thumb-button or milled head) has been within convenient reach, and whose upper end engaged the ratchet-shaft. In a lamp, however, which is provided with a detachable burner screwing into the neck of the oil fount or reservoir it is necessary to so arrange a wick-adjusting device of this character that the shaft or rod above referred to (which I shall term the "wick-adjusting shaft") may be moved to one side of or dropped away from the ratchet-shaft on the burner, which it engages, in order that it may not obstruct the rotation of the burner when the latter is removed from or applied to the oil-fount. It is also needful to provide means whereby, when the wick-raising shaft is engaged with the ratchet-shaft, the two may be positively held together in engagement. Otherwise, by an accidental movement of the burner, or from other causes, the two shafts may be separated to such an extent that the wick-raising shaft will cease to influence the ratchet-shaft.

To accomplish these results I provide the detachable burner with a ratchet-shaft having on its projecting end a pinion, and I provide the lamp-body with a rotary wick-adjusting shaft, which gears with said ratchet-shaft, and is arranged so as to move longitudinally in its bearing or bearings to such an extent that it may either be brought into engagement with the ratchet-shaft, or may be disengaged therefrom and removed out of the path of any parts carried by the burner, in order that the latter may freely rotate, as it must rotate when it is screwed into the oil-fount or removed therefrom.

I also provide the burner with a guide or bracket, which, when the wick-adjusting shaft engages the ratchet-shaft, serves to hold the said shaft positively up against and in engagement with the ratchet-shaft, and prevents any rotary movement or displacement of the burner, which would tend to separate the two shafts.

I also provide means which will hold and assure the wick-adjusting shaft in proper position in the said guide or bracket, but which also will permit the shaft to be withdrawn from the latter whenever desired.

My invention can, however, best be explained and understood by reference to the accompanying drawings, in which—

Figure 3:
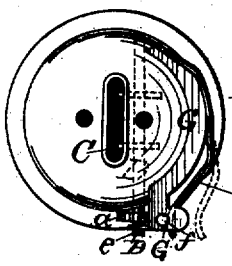
Figure 4:
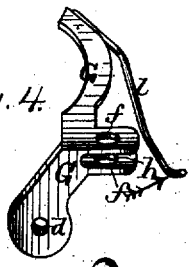
Figure 4:
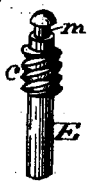
Figure 2:
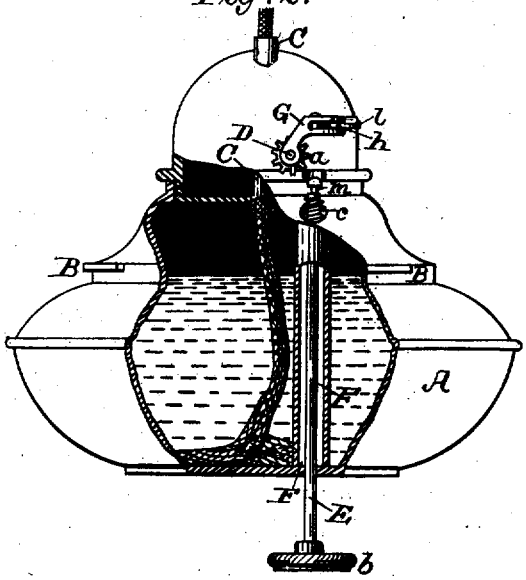

Figure 1 is a perspective view of so much of a center-lamp as is needed to illustrate my improvements. Fig. 2 is a side elevation of the same, partly in section. Fig. 3 is a top view of the lamp-burner detached. Fig. 4 is a perspective view, on an enlarged scale, of the bracket and upper part of the wick-adjusting shaft detached.

The lamp body or reservoir A is of ordinary or suitable construction, and is provided with the usual lugs B, by which it is held in place in its gallery or annular support in the manner well known to those skilled in the art to which this invention pertains. The reservoir A carries a detachable burner, whose screw-threaded base screws into the internally screw-threaded lamp-collar on the reservoir in the usual way, as shown in Fig. 2.

The burner is provided with the usual wick-tube C and ratchet-shaft D, by means of which the wick is raised or lowered.

The ratchet-shaft on its projecting end is provided with a pinion, *a*, intended to mesh with gearing on the wick-raising shaft. The latter shaft is marked E. It is carried by the lamp-reservoir in proper bearings, and its preferred arrangement is shown in the drawings.

The shaft extends through an upright tube or sleeve, F, which passes up through the body of the reservoir, and is permanently united at its ends with the reservoir, as shown. The lower end of the shaft E, below the bottom of the reservoir, has a milled button, *b*, or other conveniently-shaped knob, by means of which it may be rotated. Its upper end projecting above the reservoir is provided with gearing, such as the endless screw, *c*, intended to engage the pinion or worm-wheel *a* on the ratchet-shaft.

The wick-adjusting shaft is so situated that when the burner is screwed home into the lamp-collar the gear *c*, when the wick-adjusting shaft is raised, will be in a position to intermesh with the gear on the ratchet-shaft, as shown in Fig. 1. In this position, however, it lies in the path of the gear *a*, and consequently would prevent the burner from being screwed into or unscrewed from the lamp. In order, therefore, to permit the burner to be removed or put in place the rotary wick-adjusting shaft is made longitudinally movable in its bearings, so that it may be dropped down below the level of such parts of the burner as it would in its raised position be liable to meet. The shaft is shown thus dropped in Fig. 2. When the parts are in this position it will be seen that the burner is free to rotate without coming in contact with the shaft.

When the wick-raising shaft is in its elevated position and in engagement with the ratchet-shaft, as shown in Fig. 1, the wick can readily be adjusted by taking the button or knob *b* between the fingers and rotating the wick-adjusting shaft in the required direction.

In order to prevent possibility of the gears becoming separated, either by accidental movement of the burner or from other causes, I hold the shaft or its gears against the gears on the ratchet-shaft by means of what I term a "retaining-bracket" or "guide," which is marked G in the drawings. This device is attached rigidly to the burner, and acts to lock the burner to the wick-raising shaft in such a way as to prevent the burner from rotating in a direction away from the shaft. The upper end of the shaft enters a socket or aperture in this bracket, and lateral displacement is thus effectually prevented.

In order to still further effectuate this object, I cause the bracket at its outer end to embrace the outer end of the ratchet-shaft also. For this purpose I form in the bent end *d* of the bracket an aperture, which is entered by the projecting end *e* of the ratchet-shaft, and this shaft has thus at its end, beyond the pinion *a*, a bearing, which assures it against lateral displacement, and checks any tendency in the gears to spring apart. I make use also of the bracket as a means of holding the wick-adjusting shaft in its raised position.

The upper end of the shaft is formed of a size to enter the vertical aperture or socket *f* in the bracket, and the bracket is horizontally slotted or divided, as shown at *h*, the slot intersecting the socket.

To the burner or the bracket is attached a latch, consisting of a spring-arm, *l*, the free end of which enters the slot, and, when the shaft E is in its uppermost position, lies in an annular groove, *m*, in said shaft. In this way the shaft is upheld.

When it is desired to drop the shaft it is released by taking hold of the spring-arm by its free end and drawing it away from the shaft. The latter as soon as it is released can be drawn down out of the way without trouble.

Having described my invention, and the manner in which the same is or may be carried into effect, I shall state my claim as follows:

1. The combination, substantially as set forth, of the detachable lamp-burner, the ratchet-shaft and pinion thereon, the lamp body or reservoir, the rotary wick-adjusting shaft, movable to engage or be disengaged from the ratchet-shaft, and a retaining arm or bracket on the burner for preventing lateral displacement and disengagement of said shafts.

2. A lamp-burner provided with a ratchet and pinion thereon and a retaining arm or bracket, substantially as and for the purposes set forth.

3. The combination, in a lamp, of these elements: a detachable lamp-burner provided with a ratchet-shaft and pinion thereon, a lamp reservoir or body, a rotary wick-raising shaft carried by said reservoir and longitudinally movable to engage or be disengaged from the ratchet-shaft, and a retaining bracket or guide fast to the burner, which receives the upper end of the elevated wick-raising shaft, and also clasps and furnishes a bearing for the outer end of the ratchet-shaft, substantially as and for the purposes set forth.

4. The combination, substantially as set forth, of a lamp-burner, the lamp body or reservoir, the longitudinally-movable rotary wick-raising shaft provided with gearing to mesh with gearing on the ratchet-shaft, a retaining arm or bracket fast to the lamp-burner, and means for upholding the said wick-adjusting shaft in a position to engage the ratchet-shaft.

5. The rotary wick-adjusting shaft provided with an endless screw to mesh with a pinion on the ratchet-shaft, and movable to engage and be disengaged from the said ratchet-shaft, in combination with the retaining arm or bracket on the lamp-burner and the spring-latch for maintaining the wick-adjusting shaft in its elevated position, substantially as set forth.

6. The longitudinally-movable wick-adjusting shaft, provided with a gear to mesh with the burner ratchet-shaft, and prolonged above said gear in order to furnish a spindle or journal to enter a socket formed in or on the burner, substantially as and for the purpose set forth.

In witness that I claim the above as my invention I hereunto set my hand in the presence of two witnesses.

WILLARD H. SMITH.

Witnesses:

CHAS. L. COOMBS,

FRANK GALT.